United States Patent
Sugitani et al.

(10) Patent No.: US 8,980,499 B2
(45) Date of Patent: Mar. 17, 2015

(54) PROTON-CONDUCTIVE POLYMER ELECTROLYTE MEMBRANE, AND MEMBRANE-ELECTRODE ASSEMBLY AND POLYMER ELECTROLYTE FUEL CELL USING THE SAME

(75) Inventors: Tooru Sugitani, Osaka (JP); Hiroyuki Nishii, Osaka (JP); Akira Shimazu, Osaka (JP)

(73) Assignee: Nitto Denko Corporation, Osaka (JP)

( * ) Notice: Subject to any disclaimer, the term of this patent is extended or adjusted under 35 U.S.C. 154(b) by 627 days.

(21) Appl. No.: 13/322,073

(22) PCT Filed: May 21, 2010

(86) PCT No.: PCT/JP2010/003453
§ 371 (c)(1),
(2), (4) Date: Feb. 6, 2012

(87) PCT Pub. No.: WO2010/137275
PCT Pub. Date: Dec. 2, 2010

(65) Prior Publication Data
US 2012/0129075 A1    May 24, 2012

(30) Foreign Application Priority Data
May 27, 2009   (JP) .................... 2009-127178

(51) Int. Cl.
H01M 8/10   (2006.01)
H01B 1/12   (2006.01)
H01M 8/04   (2006.01)

(52) U.S. Cl.
CPC .......... *H01B 1/122* (2013.01); *H01M 8/04261* (2013.01); *H01M 8/1011* (2013.01); *H01M 8/103* (2013.01); *H01M 8/1067* (2013.01); *Y02E 60/523* (2013.01); *H01M 8/1027* (2013.01)
USPC ........................................ 429/493

(58) Field of Classification Search
USPC ......................................... 429/493
See application file for complete search history.

(56) References Cited

U.S. PATENT DOCUMENTS

| 5,409,785 | A | 4/1995 | Nakano et al. | |
| 5,969,087 | A * | 10/1999 | Maeda | .......... 528/353 |
| 6,245,881 | B1 | 6/2001 | Faure et al. | |
| 6,586,561 | B1 * | 7/2003 | Litt et al. | ......... 528/353 |
| 6,660,062 | B2 * | 12/2003 | Liu et al. | ............ 95/45 |

(Continued)

FOREIGN PATENT DOCUMENTS

| JP | 2000-510511 | 8/2000 |
| JP | 2002-105200 | 4/2002 |

(Continued)

*Primary Examiner* — Patrick Ryan
*Assistant Examiner* — Lucas J O Donnell
(74) *Attorney, Agent, or Firm* — Hamre, Schumann, Mueller & Larson, P.C.

(57) ABSTRACT

Provided is a polyimide-based proton-conductive polymer electrolyte membrane having high methanol permeation resistance property (methanol blocking property). The proton-conductive polymer electrolyte membrane includes, as a main component, a polyimide resin formed by polycondensation of a tetracarboxylic dianhydride, a first aromatic diamine having a proton-conductive group, and a second aromatic diamine having no proton-conductive group. The second aromatic diamine has a fused ring skeleton composed of three or more rings. This electrolyte membrane is suitable for use in a polymer electrolyte fuel cell (PEFC), in particular in a direct methanol fuel cell (DMFC).

23 Claims, 1 Drawing Sheet

(56) References Cited

U.S. PATENT DOCUMENTS

| | | | |
|---|---|---|---|
| 7,018,445 B2 * | 3/2006 | Simmons et al. | 95/51 |
| 7,157,548 B2 | 1/2007 | Lee et al. | |
| 7,771,518 B2 * | 8/2010 | Yoshinaga et al. | 96/4 |
| 8,083,834 B2 * | 12/2011 | Zhou et al. | 95/51 |
| 8,772,417 B2 * | 7/2014 | Xiao et al. | 525/434 |
| 2002/0091225 A1 * | 7/2002 | McGrath et al. | 528/170 |
| 2008/0063917 A1 * | 3/2008 | Yamashita et al. | 429/33 |
| 2008/0275146 A1 * | 11/2008 | McGrath et al. | 521/27 |

FOREIGN PATENT DOCUMENTS

| | | |
|---|---|---|
| JP | 2002-538978 | 12/2002 |
| JP | 2003-068326 | 3/2003 |
| JP | 2003-277501 | 10/2003 |
| JP | 2004-509224 | 3/2004 |
| JP | 2005-015541 | 1/2005 |
| JP | 2005-501152 | 1/2005 |
| WO | 02/25764 | 3/2002 |
| WO | WO 2006/132144 | 12/2006 |

* cited by examiner

PROTON-CONDUCTIVE POLYMER ELECTROLYTE MEMBRANE, AND MEMBRANE-ELECTRODE ASSEMBLY AND POLYMER ELECTROLYTE FUEL CELL USING THE SAME

TECHNICAL FIELD

The present invention relates to a proton-conductive polymer electrolyte membrane, and a membrane-electrode assembly and a polymer electrolyte fuel cell using the same.

BACKGROUND ART

In recent years, fuel cells have received much attention as next generation energy sources. In particular, polymer electrolyte fuel cells (PEFCs) in which a polymer membrane having proton conductivity is used as an electrolyte have high energy density, and are expected to find a wide range of applications, such as home cogeneration systems, power sources for mobile devices, and power sources for automobiles. An electrolyte membrane for a PEFC is required to serve not only as an electrolyte for conducting protons between a fuel electrode and an oxidant electrode but also as a partition for separating a fuel supplied to the fuel electrode and an oxidant supplied to the oxidant electrode. If either of these functions as an electrolyte and a partition is insufficient, the power generation efficiency of the fuel cell decreases. For this reason, polymer electrolyte membranes are required to have high proton conductivity, electrochemical stability and mechanical strength, and low permeability to fuels and oxidants.

Currently, perfluorocarbon sulfonic acid that has sulfonic acid groups as proton-conductive groups (for example, "Nafion (registered trademark)" manufactured by DuPont) is widely used for electrolyte membranes for PEFCs. Membranes made of perfluorocarbon sulfonic acid have high electrochemical stability. However, these membranes are very expensive because fluororesin materials for them are not general purpose materials and their synthesis processes are complicated. The high cost of electrolyte membranes is a major obstacle to the practical use of PEFCs. Direct methanol fuel cells (DMFCs) are a type of PEFCs in which a solution containing methanol is supplied to a fuel electrode. DMFCs are advantageous in ease of supply of fuels and portability, and their potential practical applications are attracting attention. However, perfluorocarbon sulfonic acid membranes are highly permeable to methanol, which makes them difficult to use in DMFCs.

As an alternative to such perfluorocarbon sulfonic acid membranes, hydrocarbon-based polymer electrolyte membranes are being developed. Resin materials for hydrocarbon-based electrolyte membranes are less expensive than fluororesin materials, so the use of these electrolyte membranes is expected to reduce the cost of PEFCs.

JP 2000-510511 T discloses, as a hydrocarbon-based polymer electrolyte membrane, an electrolyte membrane containing a polyimide resin formed by polycondensation of a tetracarboxylic dianhydride, an aromatic diamine having a proton-conductive group, and another aromatic diamine having no proton-conductive group. This publication describes that this electrolyte membrane has high mechanical and electrochemical stability and can be produced at lower cost than perfluorocarbon sulfonic acid membranes. However, the technique disclosed in JP 2000-510511 T gives no consideration to the methanol permeation resistance property (i.e., methanol blocking property) of electrolyte membranes. The electrolyte membrane disclosed in this publication does not necessarily have high resistance to methanol permeation.

JP 2003-68326 A discloses a similar polyimide-based polymer electrolyte membrane. In this publication, an attempt is made to overcome a disadvantage of readily hydrolyzable imide bonds to form a polyimide-based electrolyte membrane having high resistance to hydrolysis (long-term water resistance). However, the technique of JP 2003-68326 A also gives no consideration to the methanol permeation resistance property of electrolyte membranes, and the electrolyte membrane disclosed in this publication does not necessarily have high resistance to methanol permeation.

CITATION LIST

Patent Literature

Patent Literature 1 JP 2000-510511 T
Patent Literature 2 JP 2003-68326 A

SUMMARY OF INVENTION

Technical Problem

It is an object of the present invention to provide a polyimide-based proton-conductive polymer electrolyte membrane having high resistance to methanol permeation (methanol crossover).

Solution to Problem

The proton-conductive polymer electrolyte membrane of the present invention includes, as a main component, a polyimide resin formed by polycondensation of a tetracarboxylic dianhydride, a first aromatic diamine having a proton-conductive group, and a second aromatic diamine having no proton-conductive group. The second aromatic diamine has a fused ring skeleton composed of three or more rings.

Advantageous Effects of Invention

The proton-conductive polymer electrolyte membrane of the present invention is a polyimide-based electrolyte membrane exhibiting high resistance to methanol permeation. The use of the first aromatic diamine having a proton-conductive group and the second aromatic diamine having a fused ring skeleton composed of three or more rings and having no proton-conductive group, as aromatic diamines to be polycondensed with the tetracarboxylic dianhydride, contributes to this high resistance. The production cost of the electrolyte membrane of the present invention is lower than that of conventional electrolyte membranes made of perfluorocarbon sulfonic acid.

DESCRIPTION OF EMBODIMENTS

(Polyimide Resin)

A polyimide resin (A) included as a main component in the proton-conductive polymer electrolyte membrane of the present invention is a resin formed by polycondensation of a tetracarboxylic dianhydride, a first aromatic diamine having a proton-conductive group, and a second aromatic diamine having no proton-conductive group. The second aromatic diamine has a fused ring skeleton (D) composed of three or more rings. The polyimide resin (A) has high resistance to methanol permeation.

The polyimide resin (A) has a structural unit (B) and a structural unit (C). The structural unit (B) is formed by polycondensation of the tetracarboxylic dianhydride and the first aromatic diamine, and the structural unit (C) is formed by polycondensation of the tetracarboxylic dianhydride and the second aromatic diamine. The structural unit (B) is represented by the following formula (1), and the structural unit (C) is represented by the following formula (2).

[Chemical Formula 1]

(1)

In Formula (1), $R^1$ corresponds to a part other than carboxylic anhydrides of the tetracarboxylic dianhydride, and $R^2$ corresponds to a part other than amino groups of the first aromatic diamine.

[Chemical Formula 2]

(2)

In Formula (2), $R^3$ corresponds to a part other than carboxylic anhydrides of the tetracarboxylic dianhydride, as in the case of $R^1$ in Formula (1), and $R^4$ corresponds to a part other than amino groups of the second aromatic diamine. $R^4$ has a fused ring skeleton composed of three or more rings.

The structural unit (B) contributes mainly to the proton conductivity of the polyimide resin (A) and that of the polymer electrolyte membrane of the present invention containing this resin as a main component. The structural unit (C) contributes mainly to the methanol permeation resistance property of the polyimide resin (A) and that of the polymer electrolyte membrane of the present invention containing this resin as a main component.

The tetracarboxylic dianhydride is not particularly limited as long as it has a structure that allows formation of a polyimide resin by polycondensation with an aromatic diamine. Examples of such tetracarboxylic dianhydrides include para-terphenyl-3,4,3",4"-tetracarboxylic dianhydride, pyromellitic dianhydride, 3,3',4,4'-benzophenonetetracarboxylic dianhydride, 3,3',4,4'-biphenyltetracarboxylic dianhydride, 3,3',4,4'-biphenylethertetracarboxylic dianhydride, 1,2,5,6-naphthalenetetracarboxylic dianhydride, 2,3,6,7-naphthalenetetracarboxylic dianhydride, 2,3,5,6-pyridinetetracarboxylic dianhydride, naphthalene-1,4,5,8-tetracarboxylic dianhydride, 4,4'-ketone dinaphthalene-1,1',8,8'-tetracarboxylic dianhydride, 4,4'-binaphthyl-1,1',8,8'-tetracarboxylic dianhydride, 3,4,9,10-perylenetetracarboxylic dianhydride, 4,4'-sulfonyldiphthalic dianhydride, 3,3',4,4'-tetraphenylsilanetetracarboxylic dianhydride, metha-terphenyl-3,3",4,4"-tetracarboxylic dianhydride, 3,3',4,4'-diphenylethertetracarboxylic dianhydride, 1,3-bis(3,4-dicarboxyphenyl)-1,1,3,3-tetramethyldisiloxane dianhydride, 1-(2,3-dicarboxyphenyl)-3-(3,4-dicarboxyphenyl)-1,1,3,3-tetramethyldisiloxane dianhydride, 2,2-bis(3,4-dicarboxyphenyl)hexafluoropropane dianhydride, 1,2,3,4-butanetetracarboxylic dianhydride, and 1,3,3a,4,5,9b-hexahydro-5-(tetrahydro-2,5-dioxo-3-furanyl)-naphtho[1,2-c]-furan-1,3-dione.

Considering the water resistance, oxidation resistance, and electrochemical stability as polymer electrolyte membranes, the tetracarboxylic dianhydride preferably is at least one selected from naphthalene-1,4,5,8-tetracarboxylic dianhydride, 4,4'-ketone dinaphthalene-1,1',8,8'-tetracarboxylic dianhydride, and 4,4'-binaphthyl-1,1',8,8'-tetracarboxylic dianhydride.

The polyimide resin (A) may be formed by polycondensation between the first and second aromatic diamines and two or more kinds of tetracarboxylic dianhydrides.

The first aromatic diamine is not particularly limited as long as it has a molecular structure that allows formation of a polyimide resin by polycondensation with a tetracarboxylic dianhydride and has a proton-conductive group.

The proton-conductive group may be a sulfonic acid group, a phosphoric acid group, or a carboxyl group, for example. The proton-conductive group preferably is a sulfonic acid group because of its high proton conductivity. The sulfonic acid group and the phosphoric acid group include groups in the form of salt such as sodium salt and ammonium salt (for example, a sodium sulfonate group). However, if the sulfonic acid group or the phosphoric acid group is in the salt form, it is preferable that the group be converted into the proton form (proton-exchanged) by acid treatment or the like before an electrolyte membrane is finally formed.

Examples of the first aromatic diamine include aromatic diamines each having a sulfonic acid group described in JP 2000-510511 T and JP 2003-68326 A. More specific examples are aromatic diamines represented by the following formulae (3) to (10).

[Chemical Formula 3]

(3)

(4)

(5)

-continued (6)

(7)

(8)

(9)

(10)

Aromatic diamines are diamines in which at least one amino group is bonded to an aromatic group. Typically, aromatic diamines have a structure in which two amino groups are bonded to an aromatic group or aromatic groups. In this case, the two amino groups both may be bonded to one aromatic group, or they may be bonded to separate aromatic groups. The aromatic groups to which these amino groups are bonded may be the same type or different types. The aromatic group may be monocyclic or polycyclic. If it is a polycyclic aromatic group, it may have a fused ring. The aromatic group may be an aromatic hydrocarbon group or a heteroaromatic group. A part of hydrogen atoms in the aromatic ring may be substituted with a substituent group such as an alkyl group having 1 to 6 carbon atoms, a perfluoroalkyl group having 1 to 6 carbon atoms, a halogen group, a hydroxy group, a phenyl group, or the like. Typically, the substituent group is an alkyl group having 1 to 6 carbon atoms (for example, a methyl group), a perfluoroalkyl group having 1 to 6 carbon atoms (for example, a $CF_3$ group), or a phenyl group.

The second aromatic diamine is not particularly limited as long as it has a structure that allows formation of a polyimide resin by polycondensation with a tetracarboxylic dianhydride and has the fused ring skeleton (D) composed of three or more rings. This fused ring skeleton (D) of the second aromatic diamine imparts high methanol permeation resistance property (high methanol blocking property) to the resulting polyimide resin (A). The reasons for this are not entirely clear, but the present inventors presume that the significantly increased planarity of polyimide molecules facilitates stacking them so that they are aligned parallel to the plane direction of the electrolyte membrane, and this molecular structure easily blocks the permeation of methanol in the thickness direction of the membrane.

Preferably, the second aromatic diamine has a structure in which two amino groups are bonded directly to the fused ring skeleton (D). In this case, the polyimide resin (A) has improved resistance to methanol permeation.

The fused ring skeleton (D) is, for example, a fluorene skeleton in which a carbon atom at position 9 may be substituted with an oxygen atom, a nitrogen atom, or a sulfur atom. Hydrogen atoms bonded to carbon atoms at positions other than the 9 position may be substituted with the substituent groups exemplified in the description of aromatic groups.

The fluorene skeleton is represented by the following formula (11). In Formula (11), when the atom at position 9, that is $X^1$, is a carbon atom, $R^5$ and $R^6$ are, independently from each other, a hydrogen atom, a hydroxy group, a carbonyl group, a phenyl group (in which a hydrogen atom may be substituted with a methyl group, a $CF_3$ group, or a hydroxy group), an alkyl group having 1 to 6 carbon atoms, or a perfluoroalkyl group having 1 to 6 carbon atoms. When $X^1$ is an oxygen atom, $R^5$ and $R^6$ are not present. When $X^1$ is a nitrogen atom, $R^5$ is a hydrogen atom and $R^6$ is not present. When $X^1$ is a sulfur atom, $R^5$ and $R^6$ are oxygen atoms.

[Chemical Formula 4]

(11)

When the fused ring skeleton (D) is the above-mentioned fluorene skeleton, it is preferable that two amino groups are bonded directly to this fluorene skeleton, as shown in the following formula (12). In this case, the polyimide resin (A) has further improved resistance to methanol permeation. Preferably, one of the amino groups is bonded to one of the carbon atoms at positions 1 to 4 and the other amino group is bonded to one of the carbon atoms at positions 5 to 8, as shown in Formula (12). Examples of the second aromatic diamine having this preferable fused ring skeleton (D) are represented by the following formulae (13) and (14).

[Chemical Formula 5]

(12)

[Chemical Formula 6]

(13)

[Chemical Formula 7]

(14)

The aromatic diamine represented by Formula (13) is 2,7-diaminofluorene (DAF), and the aromatic diamine represented by Formula (14) is 3,7-diamino-2,8-dimethyldibenzothiophene sulfone (DDBT).

An example of the fused ring skeleton (D) different from these fluorene skeletons is a fused ring skeleton having an ortho-peri-fused ring. The fused ring skeleton (D) having an ortho-peri-fused ring has higher planarity than a fused ring skeleton composed of only ortho-fused rings. This allows the polyimide resin (A) to have improved resistance to methanol permeation.

The fused ring skeleton (D) having an ortho-peri-fused ring is, for example, a pyrene skeleton or a phenalene skeleton. Preferably, two amino groups are bonded directly to the fused ring skeleton (D). In this case, the polyimide resin (A) has further improved resistance to methanol permeation. An example of the second aromatic diamine having this preferable fused ring skeleton (D) is represented by the following formula (15).

[Chemical Formula 8]

(15)

The aromatic diamine represented by Formula (15) is 1,6-diaminopyrene (DAP).

The fused ring skeleton (D) may be a phenanthridine skeleton. In this case, preferably, two amino groups are bonded directly to the phenanthridine skeleton. Thereby, the polyimide resin (A) has further improved resistance to methanol permeation. An example of the second aromatic diamine having this preferable fused ring skeleton (D) is represented by the following formula (16).

[Chemical Formula 9]

(16)

The aromatic diamine represented by Formula (16) is 3,8-diamino-6-phenylphenanthridine (D6PPT).

The proportions of the structural units (B) and (C) in all the structural units of the polyimide resin (A) (i.e., the contents of the structural units (B) and (C) in the polyimide resin (A)) are not particularly limited. For example, the proportion of the structural units (B) is 50 to 95 mol %, and that of the structural units (C) is 5 to 50 mol %. The proton-conductive polymer electrolyte membrane of the present invention can provide a better balance between the proportions of (B) and (C) than ever before (for example, it can have a higher [κ/MCO] ratio of the proton conductivity κ to the methanol crossover rate MCO than ever before).

The ion exchange capacity of the polyimide resin (A) preferably is 0.5 to 3.0 meq/g, and more preferably 1.0 to 2.5 meq/g. When the ion exchange capacity is excessively high, the degree of swelling of the electrolyte membrane during use increases, resulting in a deformation of the membrane or a decrease in the resistance to methanol permeation. On the other hand, when the ion exchange capacity is excessively low, the proton conductivity of the electrolyte membrane decreases, resulting in insufficient power generation performance as an electrolyte membrane. The ion exchange capacity of the polyimide resin (A) can be adjusted by the kind of the first aromatic diamine and the contents of the structural units (B) and (C).

Known methods for producing polyimide resins can be used to produce the polyimide resin (A). During the production, the contents of the structural units (B) and (C) in the resulting polyimide resin (A) can be controlled by adjusting the amounts of the first and second aromatic diamines in the polymerization system.

(Proton-Conductive Polymer Electrolyte Membrane)

The proton-conductive polymer electrolyte membrane of the present invention includes the polyimide resin (A) as a main component. As used herein, the "main component" means a component having the largest content in the electrolyte membrane. Typically, the content is 50 wt % or more, preferably 60 wt % or more, and further preferably 70 wt % or more. The proton-conductive polymer electrolyte membrane of the present invention may consist of the polyimide resin (A).

The proton-conductive polymer electrolyte membrane of the present invention has high resistance to methanol permeation. For example, its methanol crossover rate (MCO) is 0.025 mmol/Hr/cm or less at 60° C. The methanol crossover rate is 0.020 mmol/Hr/cm or less, depending on the structure of the structural unit (C) in the polyimide resin (A) (i.e., the kind of the second aromatic diamine) and the content thereof.

The proton-conductive polymer electrolyte membrane of the present invention has high proton conductivity. For example, its proton conductivity κ, which was measured in Examples, is 0.13 S/cm or more. The proton conductivity κ is 0.15 S/cm or more, depending on the structure of the polyimide resin (A).

The proton-conductive polymer electrolyte membrane of the present invention can provide a better balance between the resistance to methanol permeation and the proton conductivity than ever before. For example, the (κ/MCO) ratio of the proton conductivity κ to the methanol crossover rate (MCO), which was measured in Examples, is 7000 S·Hr/mol or more. The ratio is 7500 S·Hr/mol or more, 8000 S·Hr/mol or more, or 8500 S·Hr/mol or more, depending on the structure of the polyimide resin (A).

Preferably, the thickness of the proton-conductive polymer electrolyte membrane of the present invention is 10 to 200 μm when it is used for common PEFCs including DMFCs, although the thickness depends on the application. The thickness preferably is 20 to 100 μm, in view of the balance among mechanical strength, proton conductivity, and resistance to methanol permeation. If the thickness of the electrolyte membrane is too small, the proton conductivity increases but the mechanical strength and the resistance to methanol permeation decrease even more, resulting in a decrease in utility as an electrolyte membrane. On the other hand, if the thickness is too large, the mechanical strength and the resistance to methanol permeation increase but the proton conductivity decreases, making it difficult to use the electrolyte membrane in a PEFC and a DMFC.

The proton-conductive polymer electrolyte membrane of the present invention may additionally include a resin other than the polyimide resin (A) or an additive as long as the main component thereof is the polyimide resin (A) and the effects of the present invention can be obtained. Examples of the resin other than the polyimide resin (A) include polyarylene ether resins and polyether sulfone resins. Examples of the additive include a crosslinking agent, an antioxidant, a radical quencher, and an inorganic filler such as silica gel.

The structure of the proton-conductive polymer electrolyte membrane of the present invention is not particularly limited as long as the advantageous effects of the present invention can be obtained.

Although the applications of the electrolyte membrane of the present invention are not particularly limited, it is suitable for use as a polymer electrolyte membrane (PEM) for PEFCs, particularly suitable for use as a PEM for DMFCs in which a methanol-containing solution is used as a fuel.

(Membrane-Electrode Assembly)

Figure 1:
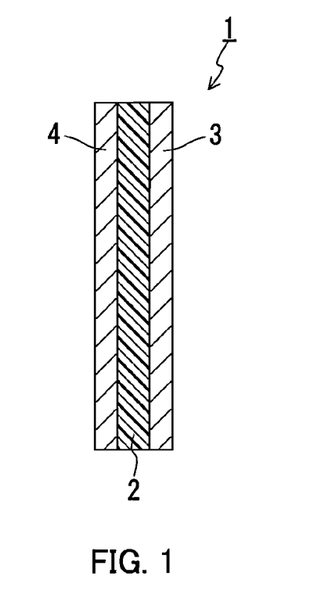
FIG. 1 is a schematic diagram showing one example of a membrane-electrode assembly of the present invention.

FIG. 1 shows one example of the membrane-electrode assembly (MEA) of the present invention.

An MEA 1 shown in FIG. 1 includes an electrolyte membrane 2 and a pair of electrodes (an anode electrode 3 and a cathode electrode 4) disposed so as to sandwich the electrolyte membrane 2 therebetween, and the electrodes 3, 4 each are bonded to the electrolyte membrane 2. This electrolyte membrane 2 is the above-described proton-conductive polymer electrolyte membrane of the present invention. The power generation performance of a PEFC, in particular a DMFC using a methanol-containing solution as a fuel, can be improved if the MEA 1 is incorporated into the PEFC.

The anode electrode (fuel electrode) 3 and the cathode electrode (oxidant electrode) 4 may each have the same configuration as that used for common MEAs.

The MEA 1 can be formed by a known technique, for example, by hot pressing the electrodes 3, 4 to the electrolyte membrane 2.

(Polymer Electrolyte Fuel Cell)

Figure 2:
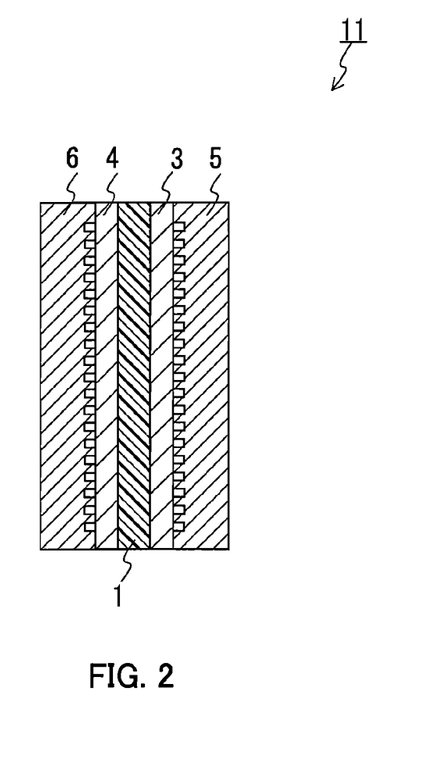
FIG. 2 is a schematic diagram showing one example of a fuel cell of the present invention.

FIG. 2 shows one example of the polymer electrolyte fuel cell of the present invention.

A fuel cell 11 shown in FIG. 2 includes the electrolyte membrane 2, a pair of electrodes (the anode electrode 3 and the cathode electrode 4) disposed so as to sandwich the electrolyte membrane 2 therebetween, and a pair of separators (an anode separator 5 and a cathode separator 6) disposed so as to sandwich the pair of electrodes therebetween. These members are joined together with pressure applied in the direction perpendicular to the main surface of each of the members. The electrolyte membrane 2 and the electrodes 3, 4 constitute the MEA 1. Here, the electrolyte membrane 2 is the above-described proton-conductive polymer electrolyte membrane of the present invention, and the fuel cell 11 is allowed to exhibit high power generation performance (in particular, as a DMFC using a methanol-containing solution as a fuel).

The anode electrode (fuel electrode) 3, the cathode electrode (oxidant electrode) 4, the anode separator 5, and the cathode separator 6 may each have the same configuration as that used for common PEFCs.

The fuel cell of the present invention may include members other than those shown in FIG. 2, if necessary. Although the PEFC 11 shown in FIG. 2 is a so-called single cell, the fuel cell of the present invention may be a fuel cell stack in which such single cells are stacked.

EXAMPLES

Hereinafter, the present invention will be described in more detail with reference to the following examples. The present invention is not limited to the following examples.

First, the methods used to evaluate electrolyte membranes produced in the examples are described.

[Ion Exchange Capacity: IEC]

A produced electrolyte membrane (with an area of about 12 cm$^2$) was immersed in a sodium chloride aqueous solution with a concentration of 3 mol/L, and the aqueous solution was heated to 60° C. in a water bath and kept at this temperature for at least 12 hours. Next, the aqueous solution was cooled to room temperature, and then the electrolyte membrane was taken out of the aqueous solution and washed thoroughly with ion exchanged water. All the ion exchanged water used for the washing was added to the aqueous solution after the electrolyte membrane was removed. Next, the amount of protons (hydrogen ions) contained in the aqueous solution from which the electrolyte membrane had been removed was titrated with a 0.05 N sodium hydroxide aqueous solution using an automatic potentiometric titrator (AT-510, Kyoto Electronics Manufacturing Co., Ltd.). From the amount of protons thus obtained and the weight of the produced electrolyte membrane that had been measured in advance of the immersion in the sodium chloride aqueous solution, the ion exchange capacity (meq/g) of the electrolyte membrane was calculated.

[Proton Conductivity: κ]

A produced electrolyte membrane was immersed in a sulfuric acid aqueous solution with a concentration of 1 M, and the membrane resistance Rm in the thickness direction was measured with the electrolyte membrane being kept immersed therein. The membrane resistance Rm can be obtained from the slope of voltage drop in the thickness direction of the electrolyte membrane at a current of 0 to 0.3 A (i.e., the slope of potential differences in the thickness direction of the electrolyte membrane against the applied current). For the measurement, the electrolyte membrane was immersed in water at 25° C. for at least 1 hour to be swollen in advance of the immersion in the sulfuric acid aqueous solution. The proton conductivity κ(S/cm) can be calculated by the following formula (17):

$$\kappa(S/cm) = 1/Rm \cdot d/A \quad (17)$$

In Formula (17), d is the measured thickness (cm) of the electrolyte membrane, and A is the measured area (cm$^2$) of the electrolyte membrane.

[Methanol Crossover Rate: MCO]

Two glass containers of the same shape were joined together at their openings with the produced electrolyte membrane as a partition sandwiched therebetween. Next, a methanol aqueous solution with a concentration of 3 mol/L (the temperature of the solution was 60° C.) was poured into one of the glass containers from another opening of the container, and distilled water with a temperature of 60° C. was poured into the other glass container from another opening of this container. Thereafter, the amount of methanol that had permeated to the distilled water side through the electrolyte membrane was quantified at regular intervals while the entire containers were kept at 60° C. in a water bath. The quantification of methanol was performed by gas chromatography (GC), and a calibration curve created from the GC measurement for a methanol aqueous solution having a predetermined concentration was used for the quantification. The quantified methanol amount was plotted against elapsed time, and from the slope of the plots, the methanol crossover rate (mmol/hr/cm) of the electrolyte membrane was obtained by the following formula (18):

$$\text{Methanol crossover rate} = \text{Slope of plots (mmol/hr)}/S \times t2 \quad (18)$$

In Formula (18), S is the area of the partition portion in the electrolyte membrane, and t2 is the thickness of the swollen electrolyte membrane that was measured immediately after the evaluation of the MCO.

[Rate of Weight Change when Swollen with Water]

The produced electrolyte membrane was allowed to stand for at least 1 hour in an atmosphere having a temperature of 23° C. and a relative humidity of 55%, and then the weight (dry weight) thereof was measured. Separately, the produced electrolyte membrane was immersed in ion exchanged water at a temperature of 25° C. and kept immersed for at least 1 hour, and then the weight (wet weight) thereof was measured. From these weights thus measured, the rate (%) of weight change in the electrolyte membrane when swollen with water was calculated by the following formula (19):

$$\text{Rate of weight change (\%)} = (\text{Wet weight/Dry weight} - 1) \times 100 \quad (19)$$

[Rate of Area Change when Swollen with Water]

The produced electrolyte membrane was cut into rectangular pieces of 50 mm×55 mm. The specimen thus obtained was allowed to stand for at least 1 hour in an atmosphere having a temperature of 23° C. and a relative humidity of 55%, and then the lengths (dry lengths) of the four sides thereof were measured. Separately, the produced electrolyte membrane was cut into rectangular pieces of 50 mm×55 mm. The specimen thus obtained was immersed in ion exchanged water at a temperature of 25° C. and kept immersed for at least 1 hour, and then the lengths (wet lengths) of the four sides thereof were measured. The lengths of the membrane specimen were measured with careful attention to the MD direction and the TD direction of the specimen (in Examples, the electrolyte membranes were produced by casting). After the measurement, the rate (%) of area change in the electrolyte membrane when swollen with water was calculated by the following formula (20):

$$\text{Rate of area change (\%)} = \{[(\text{Total length of two wet lengths in the } MD \text{ direction}) \times (\text{Total length of two wet lengths in the } TD \text{ direction})]/[(\text{Total length of two dry lengths in the } MD \text{ direction}) \times (\text{Total length of two dry lengths in the } TD \text{ direction})] - 1\} \times 100 \quad (20)$$

[Rate of Thickness Change when Swollen with Water]

The produced electrolyte membrane was allowed to stand for at least 1 hour in an atmosphere having a temperature of 23° C. and a relative humidity of 55%. Then, the thickness of the specimen was measured at five points of the four corners and the center point thereof, and the average of the five measurements (average dry thickness) was obtained. Separately, the produced electrolyte membrane was immersed in ion exchanged water at a temperature of 25° C. and kept immersed for at least 1 hour. Then, the thickness of the specimen was measured at five points of the four corners and the center point thereof, and the average of the five measurements (average wet thickness) was obtained. From these average thicknesses thus obtained, the rate (%) of thickness change in the electrolyte membrane when swollen with water was calculated by the following formula (21):

$$\text{Rate of thickness change (\%)} = (\text{Average wet thickness/Average dry thickness} - 1) \times 100 \quad (21)$$

Example 1

2.43 g of 4,4'-bis(4-aminophenoxy)biphenyl-3,3'-disulfonic acid (BAPBDS) represented by the following formula (22) as a first aromatic diamne, 0.451 g of 2,7-diaminofluorene (DAF) represented by the following formula (13) as a second aromatic diamine, 15 mL of m-cresol as a polymerization solvent, and 1.32 mL of triethylamine were added into a 100 mL four-necked flask, and these materials were stirred under a nitrogen flow at an internal temperature of 80° C. to dissolve these materials homogeneously. After the materials were dissolved, 1.85 g of naphthalene-1,4,5,8-tetracarboxylic dianhydride (NTDA) as a tetracarboxylic dianhydride and 1.32 g of benzoic acid as a reaction catalyst were added into the four-necked flask, and then the polymerization was allowed to proceed at 180° C. for 20 hours with stirring the mixture under a continuous nitrogen flow in the flask. After the polymerization was completed, the resulting polymer solution was dropped into acetone, and the precipitated solid was filtered and dried. Next, the solid thus obtained was dissolved in m-cresol to obtain a casting solution with a concentration of 8 wt %. The casting solution was cast on a glass plate with a thickness of 800 μm. After the casting, the solution cast on the glass plate was dried at 120° C. for 12 hours to form a cast membrane. The cast membrane thus obtained was immersed in sulfuric acid with a concentration of 1 mol/L at 60° C. for 24 hours to undergo proton exchange. Next, the proton-exchanged cast membrane was washed with pure water, and subjected to vacuum drying at 150° C. for 12 hours. Thus, an electrolyte membrane was obtained.

[Chemical Formula 10]

(22)

[Chemical Formula 11]

(13)

Example 2

2.11 g of BAPBDS as a first aromatic diamine, 0.465 g of 1,6-diaminopyrene (DAP) represented by the following formula (15) as a second aromatic diamine, 25 mL of m-cresol as a polymerization solvent, and 1.15 mL of triethylamine were added into a 100 mL four-necked flask, and these materials were stirred under a nitrogen flow at an internal temperature of 80° C. to dissolve these materials homogeneously. After the materials were dissolved, 1.61 g of NTDA as a tetracarboxylic dianhydride and 1.15 g of benzoic acid as a reaction catalyst were added into the four-necked flask, and then the polymerization was allowed to proceed at 180° C. for 20 hours with stirring the mixture under a continuous nitrogen flow in the flask. After the polymerization was completed, the resulting polymer solution was dropped into acetone, and the precipitated solid was filtered and dried. Next, the solid thus obtained was dissolved in m-cresol to obtain a casting solution with a concentration of 6.5 wt %. The casting solution was cast on a glass plate with a thickness of 900 μm. After the casting, the solution cast on the glass plate was dried at 120° C. for 12 hours to form a cast membrane. The cast membrane thus obtained was immersed in sulfuric acid with a concentration of 1 mol/L at 60° C. for 24 hours to undergo proton exchange. Next, the proton-exchanged cast membrane was washed with pure water, and subjected to vacuum drying at 150° C. for 12 hours. Thus, an electrolyte membrane was obtained.

[Chemical Formula 12]

(15)

Example 3

2.43 g of BAPBDS as a first aromatic diamine, 0.63 g of 3,7-diamino-2,8-dimethyldibenzothiophene sulfone (DDBT) represented by the following formula (14) as a second aromatic diamine, 25 mL of m-cresol as a polymerization solvent, and 1.32 mL of triethylamine were added into a 100 mL four-necked flask, and these materials were stirred under a nitrogen flow at an internal temperature of 80° C. to dissolve these materials homogeneously. After the materials were dissolved, 1.85 g of NTDA as a tetracarboxylic dianhydride and 1.32 g of benzoic acid as a reaction catalyst were added into the four-necked flask, and then the polymerization was allowed to proceed at 180° C. for 20 hours with stirring the mixture under a continuous nitrogen flow in the flask. After the polymerization was completed, the resulting polymer solution was dropped into acetone, and the precipitated solid was filtered and dried. Next, the solid thus obtained was dissolved in m-cresol to obtain a casting solution with a concentration of 8 wt %. The casting solution was cast on a glass plate with a thickness of 800 μm. After the casting, the solution cast on the glass plate was dried at 120° C. for 12 hours to form a cast membrane. The cast membrane thus obtained was immersed in sulfuric acid with a concentration of 1 mol/L at 60° C. for 24 hours to undergo proton exchange. Next, the proton-exchanged cast membrane was washed with pure water, and subjected to vacuum drying at 150° C. for 12 hours. Thus, an electrolyte membrane was obtained.

[Chemical Formula 13]

(14)

Example 4

2.43 g of BAPBDS as a first aromatic diamine, 0.656 g of 3,8-diamino-6-phenylpentyl phenanthiridine (D6PPT) represented by the following formula (16) as a second aromatic diamine, 25 mL of m-cresol as a polymerization solvent, and 1.32 mL of triethylamine were added into a 100 mL four-necked flask, and these materials were stirred under a nitrogen flow at an internal temperature of 80° C. to dissolve these materials homogeneously. After the materials were dissolved, 1.85 g of NTDA as a tetracarboxylic dianhydride and 1.32 g of benzoic acid as a reaction catalyst were added into the four-necked flask, and then the polymerization was allowed to proceed at 180° C. for 20 hours with stirring the mixture under a continuous nitrogen flow in the flask. After the polymerization was completed, the resulting polymer solution was dropped into acetone, and the precipitated solid was filtered and dried. Next, the solid thus obtained was dissolved in m-cresol to obtain a casting solution with a concentration of 5 wt %. The casting solution was cast on a glass plate with a thickness of 800 μm. After the casting, the solution cast on the glass plate was dried at 120° C. for 12 hours to form a cast membrane. The cast membrane was immersed in sulfuric acid with a concentration of 1 mol/L at 60° C. for 24 hours to undergo proton exchange. Next, the proton-exchanged cast membrane was washed with pure water, and subjected to vacuum drying at 150° C. for 12 hours. Thus, an electrolyte membrane was obtained.

[Chemical Formula 14]

(16)

Comparative Example 1

3.65 g of BAPBDS as a first aromatic diamine, 15 mL of m-cresol as a polymerization solvent, and 1.32 mL of triethylamine were added into a 100 mL four-necked flask, and these materials were stirred under a nitrogen flow at an internal temperature of 80° C. to dissolve these materials homogeneously. After the materials were dissolved, 1.85 g of NTDA as a tetracarboxylic dianhydride and 1.32 g of benzoic acid as a reaction catalyst were added into the four-necked flask, and then the polymerization was allowed to proceed at 180° C. for 20 hours with stirring the mixture under a continuous nitrogen flow in the flask. After the polymerization was completed, the resulting polymer solution was dropped into acetone, and the precipitated solid was filtered and dried. Next, the solid thus obtained was dissolved in m-cresol to obtain a casting solution with a concentration of 8 wt %. The casting solution was cast on a glass plate with a thickness of 800 μm. After the casting, the solution cast on the glass plate was dried at 120° C. for 12 hours to form a cast membrane. The cast membrane thus obtained was immersed in sulfuric acid with a concentration of 1 mol/L at 60° C. for 24 hours to undergo proton exchange. Next, the proton-exchanged cast membrane was washed with pure water, and subjected to vacuum drying at 150° C. for 12 hours. Thus, an electrolyte membrane was obtained.

Comparative Example 2

2.43 g of BAPBDS as a first aromatic diamine, 0.249 g of 1,4-phynylenediamine (PPD) represented by the following formula (23) as an aromatic diamine having no proton-conductive group, 25 mL of m-cresol as a polymerization solvent, and 1.32 mL of triethylamine were added into a 100 mL four-necked flask, and these materials were stirred under a nitrogen flow at an internal temperature of 80° C. to dissolve these materials homogeneously. After the materials were dissolved, 1.85 g of NTDA as a tetracarboxylic dianhydride and 1.32 g of benzoic acid as a reaction catalyst were added into the four-necked flask, and then the polymerization was allowed to proceed at 180° C. for 20 hours with stirring the mixture under a continuous nitrogen flow in the flask. After the polymerization was completed, the resulting polymer solution was dropped into acetone, and the precipitated solid was filtered and dried. Next, the solid thus obtained was dissolved in m-cresol to obtain a casting solution with a concentration of 8 wt %. The casting solution was cast on a glass plate with a thickness of 800 μm. After the casting, the solution cast on the glass plate was dried at 120° C. for 12 hours to form a cast membrane. The cast membrane thus obtained was immersed in sulfuric acid with a concentration of 1 mol/L at 60° C. for 24 hours to undergo proton exchange. Next, the proton-exchanged cast membrane was washed with pure water, and subjected to vacuum drying at 150° C. for 12 hours. Thus, an electrolyte membrane was obtained.

[Chemical Formula 15]

(23)

Comparative Example 3

2.43 g of BAPBDS as a first aromatic diamine, 0.364 g of 1,5-naphthalenediamine (15ND) represented by the following formula (24) as an aromatic diamine having no proton-conductive group, 15 mL of m-cresol as a polymerization solvent, and 1.32 mL of triethylamine were added into a 100 mL four-necked flask, and these materials were stirred under a nitrogen flow at an internal temperature of 80° C. to dissolve these materials homogeneously. After the materials were dissolved, 1.85 g of NTDA as a tetracarboxylic dianhydride and 1.32 g of benzoic acid as a reaction catalyst were added into the four-necked flask, and then the polymerization was allowed to proceed at 180° C. for 20 hours with stirring the mixture under a continuous nitrogen flow in the flask. After the polymerization was completed, the resulting polymer solution was dropped into acetone, and the precipitated solid was filtered and dried. Next, the solid thus obtained was dissolved in m-cresol to obtain a casting solution with a concentration of 8 wt %. The casting solution was cast on a glass plate with a thickness of 800 μm. After the casting, the solution cast on the glass plate was dried at 120° C. for 12 hours to form a cast membrane. The cast membrane thus obtained was immersed in sulfuric acid with a concentration of 1 mol/L at 60° C. for 24 hours to undergo proton exchange. Next, the proton-exchanged cast membrane was washed with pure water, and subjected to vacuum drying at 150° C. for 12 hours. Thus, an electrolyte membrane was obtained.

[Chemical Formula 16]

(24)

Comparative Example 4

1.21 g of 2,2'-benzidinedisulfonic acid (BDSA) represented by the following formula (25) as a first aromatic diamine, 0.378 g of PPD as an aromatic diamine having no proton-conductive group, 25 mL of m-cresol as a polymerization solvent, and 1.0 mL of triethylamine were added into a 100 mL four-necked flask, and these materials were stirred under a nitrogen flow at an internal temperature of 80° C. to dissolve these materials homogeneously. After the materials were dissolved, 1.88 g of NTDA as a tetracarboxylic dianhydride and 1.0 g of benzoic acid as a reaction catalyst were added into the four-necked flask, and then the polymerization was allowed to proceed at 180° C. for 20 hours with stirring the mixture under a continuous nitrogen flow in the flask. After the polymerization was completed, the resulting polymer solution was dropped into acetone, and the precipitated solid was filtered and dried. Next, the solid thus obtained was dissolved in m-cresol to obtain a casting solution with a concentration of 6 wt %. The casting solution was cast on a glass plate with a thickness of 900 μm. After the casting, the solution cast on the glass plate was dried at 120° C. for 12 hours to form a cast membrane. The cast membrane thus obtained was immersed in sulfuric acid with a concentration of 1 mol/L at 60° C. for 24 hours to undergo proton exchange. Next, the proton-exchanged cast membrane was washed with pure water, and subjected to vacuum drying at 150° C. for 12 hours. Thus, an electrolyte membrane was obtained.

[Chemical Formula 17]

(25)

Reference Example

A Nafion 115 membrane (manufactured by DuPont), a commercially available perfluorocarbon sulfonic acid membrane, was used without modification, as a reference example.

Tables 1 and 2 below show the evaluation results of the properties of the electrolyte membranes produced in Examples 1 to 4 and Comparative Examples 1 to 4 and the Nafion 115 membrane as a reference example. In Table 1, "ϕ" indicates the (κ/MCO) ratio of the proton conductivity κ to the methanol crossover rate (MCO) in each electrolyte membrane.

TABLE 1

| | First aromatic diamine | Second aromatic diamine | Ion exchange capacity (meq/g) | Proton conductivity (S/cm) | Methanol crossover rate (mmol/Hr/cm) | ϕ (S/Hr/mol) |
|---|---|---|---|---|---|---|
| Example 1 | BAPBDS | DAF | 1.41 | 0.167 | 0.019 | 8789 |
| Example 2 | | DAP | 1.63 | 0.165 | 0.021 | 7857 |
| Example 3 | | DDBT | 1.35 | 0.148 | 0.017 | 8706 |
| Example 4 | | D6PPT | 1.29 | 0.135 | 0.016 | 8438 |
| Com. Example 1 | BAPBDS | — | 2.02 | 0.226 | 0.041 | 5512 |
| Com. Example 2 | | PPD | 1.90 | 0.208 | 0.033 | 6303 |
| Com. Example 3 | | 15ND | 1.43 | 0.175 | 0.030 | 5833 |
| Com. Example 4 | BDSA | PPD | 1.89 | 0.328 | 0.063 | 5206 |
| Reference Example | Nafion 115 | | 0.92 | 0.148 | 0.054 | 2741 |

TABLE 2

| | First aromatic diamine | Second aromatic diamine | Rate of weight change (%) | Rate of area change (%) | Rate of thickness change (%) |
|---|---|---|---|---|---|
| Example 1 | BAPBDS | DAF | 48.3 | 17.9 | 20.4 |
| Example 2 | | DAP | 45.7 | 17.8 | 29.5 |
| Example 3 | | DDBT | 39.3 | 19.5 | 22.1 |
| Example 4 | | D6PPT | 46.5 | 14.9 | 25.0 |
| Com. Example 1 | BAPBDS | — | 108.0 | 50.4 | 32.5 |
| Com. Example 2 | | PPD | 63.5 | 33.0 | 39.8 |
| Com. Example 3 | | 15ND | 51.8 | 19.9 | 15.3 |
| Com. Example 4 | BDSA | PPD | 84.9 | 23.6 | 90.7 |

As shown in Table 1, the methanol crossover rates of Examples 1 to 4 were much lower than the rate of Comparative Example 1 in which only the first diamine having a proton-conductive group was used as an aromatic diamine to be polycondensed with a tetracarboxylic dianhydride. In addition, the methanol crossover rates of Examples 1 to 4 also were much lower than the rates of Comparative Examples 2 to 4 in which the second diamines having no proton-conductive group were used in combination with the first diamines. Furthermore, although the second diamines having no proton-conductive group were used in combination in Examples 1 to 4, the decreases in their proton conductivities from Comparative Examples 1 to 4 were smaller than the decreases in their methanol crossover rates therefrom (see the values of ϕ. In Examples 1 to 4, the ϕ values of 7500 S/Hr/mol or more were obtained). These results show that the methanol crossover rates decreased preferentially in Examples 1 to 4. Referring to the rates of weight change, area change, and thickness change when swollen with water (Table 2), the change rates of Examples 1 to 4 were lower than those of Comparative Examples 1 to 4. From these results, it is presumed that the low swellability is associated with the decrease in the methanol crossover rate.

When Examples 1 to 4 were compared to one another, Examples 1, 3 and 4 having a fluorene skeleton or a phenanthridine skeleton as the fused ring skeleton exhibited particularly low methanol crossover rates and particularly high ϕ values (8500 S/Hr/cm or more).

In Comparative Example 4, the first diamine having a proton-conductive group and the second diamine having no proton-conductive group were used in combination as aromatic diamines to be polycondensed with a tetracarboxylic dianhydride, but the resulting methanol crossover rate was very high, and more methanol permeated through the membrane of Comparative Example 4 than the Nafion membrane (Reference Example), which is generally considered to be less resistant to methanol crossover. The methanol crossover rate of Comparative Example 4 was twice as high as that of Comparative Example 2 that used the same second aromatic diamine as Comparative Example 4. From this result, it is presumed that such a high methanol crossover rate is attributed to the structure of the first aromatic diamine used in Comparative Example 4. The details need further study, but for example, the methanol crossover rate could have been affected by the structure of BDSA as the first aromatic diamine in which sulfonic acid groups as proton-conductive groups are bonded to all the aromatic rings or by the content of sulfonic acid groups in the first aromatic diamine.

The present invention is applicable to other embodiments as long as they do not depart from the spirit or essential characteristics thereof. The embodiments disclosed in this description are to be considered in all respects as illustrative and not limiting. The scope of the invention is indicated by the appended claims rather than by the foregoing description, and all changes which come within the meaning and range of equivalency of the claims are intended to be embraced therein.

INDUSTRIAL APPLICABILITY

The proton-conductive polymer electrolyte membrane of the present invention can be suitably used as an electrolyte membrane for polymer electrolyte fuel cells (PEFCs), in particular for direct methanol fuel cells (DMFCs) in which a solution containing methanol is supplied to a fuel electrode. Therefore, the use of this electrolyte membrane reduces the cost of PEFCs and DMFCs, compared to the use of a conventional perfluorocarbon sulfonic acid membrane as an electrolyte membrane.

The invention claimed is:
1. A proton-conductive polymer electrolyte membrane comprising, as a main component, a polyimide resin formed by polycondensation of a tetracarboxylic dianhydride, a first aromatic diamine having a proton-conductive group, and a second aromatic diamine having no proton-conductive group, wherein
the polyimide resin includes a structural unit represented by the following formula (1) formed by the polycondensation of the tetracarboxylic dianhydride and the first aromatic diamine, and a structural unit represented by the following formula (2) formed by the polycondensation of the tetracarboxylic dianhydride and the second aromatic diamine, the second aromatic diamine has a fused ring skeleton composed of three or more rings and has a structure in which two amino groups are bonded directly to the fused ring skeleton, wherein
$R^1$ in the formula (1) and $R^3$ in the formula (2) respectively correspond to a part other than carboxylic anhydrides of the tetracarboxylic dianhydride,
$R^2$ in the formula (1) corresponds to a part other than amino groups of the first aromatic diamine, and
$R^4$ in the formula (2) corresponds to a part other than amino groups of the second aromatic diamine and includes the fused ring skeleton.

2. The proton-conductive polymer electrolyte membrane according to claim 1, wherein the fused ring skeleton is a fluorene skeleton in which a carbon atom at position 9 may be substituted with an oxygen atom, a nitrogen atom, or a sulfur atom.

3. A proton-conductive polymer electrolyte membrane comprising, as a main component, a polyimide resin formed by polycondensation of a tetracarboxylic dianhydride, a first aromatic diamine having a proton-conductive group, and a second aromatic diamine having no proton-conductive group, wherein the polyimide resin includes a structural unit represented by the following formula (1) formed by the polycondensation of the tetracarboxylic dianhydride and the first aromatic diamine, and a structural unit represented by the following formula (2) formed by the polycondensation of the tetracarboxylic dianhydride and the second aromatic diamine, the second aromatic diamine has a fused ring skeleton comprising three or more rings, and the fused ring skeleton includes an ortho-peri-fused ring, wherein
$R^1$ in the formula (1) and $R^3$ in the formula (2) respectively correspond to a part other than carboxylic anhydrides of the tetracarboxylic dianhydride,
$R^2$ in the formula (1) corresponds to a part other than amino groups of the first aromatic diamine, and
$R^4$ in the formula (2) corresponds to a part other than amino groups of the second aromatic diamine and includes the fused ring skeleton.

4. A proton-conductive polymer electrolyte membrane comprising, as a main component, a polyimide resin formed by polycondensation of a tetracarboxylic dianhydride, a first aromatic diamine having a proton-conductive group, and a second aromatic diamine having no proton-conductive group, wherein
the polyimide resin includes a structural unit represented by the following formula (1) formed by the polycondensation of the tetracarboxylic dianhydride and the first aromatic diamine, and a structural unit represented by the following formula (2) formed by the polycondensation of the tetracarboxylic dianhydride and the second aromatic diamine, the second aromatic diamine has a fused ring skeleton comprising three or more rings, and
the fused ring skeleton includes a phenanthridine skeleton, wherein
$R^1$ in the formula (1) and $R^3$ in the formula (2) respectively correspond to a part other than carboxylic anhydrides of the tetracarboxylic dianhydride,
$R^2$ in the formula (1) corresponds to a part other than amino groups of the first aromatic diamine, and R⁴ in the formula (2) corresponds to a part other than amino groups of the second aromatic diamine and has the fused ring skeleton.

5. The proton-conductive polymer electrolyte membrane according to claim 1, wherein the proton-conductive group is a sulfonic acid group.

6. The proton-conductive polymer electrolyte membrane according to claim 1, wherein the electrolyte membrane has a methanol crossover rate of 0.025 mmol/Hr/cm or less at a temperature of 60° C.

7. A membrane-electrode assembly comprising:
a polymer electrolyte membrane; and
a pair of electrodes disposed so as to sandwich the electrolyte membrane therebetween,
wherein the electrolyte membrane is a proton-conductive polymer electrolyte membrane according claim 1.

8. A polymer electrolyte fuel cell comprising:
a polymer electrolyte membrane;
a pair of electrodes disposed so as to sandwich the electrolyte membrane therebetween; and
a pair of separators disposed so as to sandwich the pair of electrodes therebetween,
wherein the electrolyte membrane is a proton-conductive polymer electrolyte membrane according to claim 1.

9. The polymer electrolyte fuel cell according to claim 8, being a direct methanol fuel cell.

10. The proton-conductive polymer electrolyte membrane according to claim 2, wherein one of the amino groups is bonded to one of the carbon atoms at positions 1 to 4 of the fluorene skeleton, and the other amino group is bonded to one of the carbon atoms at positions 5 to 8 of the fluorene skeleton.

11. The proton-conductive polymer electrolyte membrane according to claim 1, wherein the second aromatic diamine is a diamine represented by the following formula (13) or (14)

12. The proton-conductive polymer electrolyte membrane according to claim 3, wherein the second aromatic diamine has a structure in which two amino groups are bonded directly to the fused ring skeleton.

13. The proton-conductive polymer electrolyte membrane according to claim 4, wherein the second aromatic diamine has a structure in which two amino groups are bonded directly to the fused ring skeleton.

14. The proton-conductive polymer electrolyte membrane according to claim 3, wherein the proton-conductive group is a sulfonic acid group.

15. The proton-conductive polymer electrolyte membrane according to claim 4, wherein the proton-conductive group is a sulfonic acid group.

16. The proton-conductive polymer electrolyte membrane according to claim 3, wherein the electrolyte membrane has a methanol crossover rate of 0.025 mmol/Hr/cm or less at a temperature of 60° C.

17. The proton-conductive polymer electrolyte membrane according to claim 4, wherein the electrolyte membrane has a methanol crossover rate of 0.025 mmol/Hr/cm or less at a temperature of 60° C.

18. A membrane-electrode assembly comprising:
a polymer electrolyte membrane; and
a pair of electrodes disposed so as to sandwich the electrolyte membrane therebetween,
wherein the electrolyte membrane is a proton-conductive polymer electrolyte membrane according to claim 3.

19. A membrane-electrode assembly comprising:
a polymer electrolyte membrane; and
a pair of electrodes disposed so as to sandwich the electrolyte membrane therebetween,
wherein the electrolyte membrane is a proton-conductive polymer electrolyte membrane according to claim 4.

20. A polymer electrolyte fuel cell comprising:
a polymer electrolyte membrane;
a pair of electrodes disposed so as to sandwich the electrolyte membrane therebetween; and
a pair of separators disposed so as to sandwich the pair of electrodes therebetween,
wherein the electrolyte membrane is a proton-conductive polymer electrolyte membrane according to claim 3.

21. A polymer electrolyte fuel cell comprising:
a polymer electrolyte membrane;
a pair of electrodes disposed so as to sandwich the electrolyte membrane therebetween; and
a pair of separators disposed so as to sandwich the pair of electrodes therebetween,
wherein the electrolyte membrane is a proton-conductive polymer electrolyte membrane according to claim 4.

22. The polymer electrolyte fuel cell according to claim 20, wherein the polymer electrolyte fuel cell is a direct methanol fuel cell.

23. The polymer electrolyte fuel cell according to claim 21, wherein the polymer electrolyte fuel cell is a direct methanol fuel cell.

* * * * *